United States Patent
Ekin et al.

(10) Patent No.: US 10,069,357 B2
(45) Date of Patent: Sep. 4, 2018

(54) SPOKE PERMANENT MAGNET ROTOR

(71) Applicant: ARCELIK ANONIM SIRKETI, Istanbul (TR)

(72) Inventors: Cihad Ekin, Istanbul (TR); Emin Gultekin Sonmez, Istanbul (TR); Yakup Imat, Istanbul (TR); Huseyin Orhan, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 46 days.

(21) Appl. No.: 14/648,817

(22) PCT Filed: Nov. 8, 2013

(86) PCT No.: PCT/EP2013/073398
§ 371 (c)(1),
(2) Date: Jun. 1, 2015

(87) PCT Pub. No.: WO2014/082837
PCT Pub. Date: Jun. 5, 2014

(65) Prior Publication Data
US 2015/0295460 A1    Oct. 15, 2015

(30) Foreign Application Priority Data
Nov. 30, 2012    (TR) .................................. 2012/13947

(51) Int. Cl.
*H02K 1/30* (2006.01)
*H02K 1/27* (2006.01)
*H02K 1/28* (2006.01)

(52) U.S. Cl.
CPC ............. *H02K 1/2773* (2013.01); *H02K 1/30* (2013.01); *H02K 1/28* (2013.01)

(58) Field of Classification Search
CPC ...... H02K 1/2773; H02K 1/30; H02K 15/028; H02K 1/28; H02K 7/003
(Continued)

(56) References Cited

U.S. PATENT DOCUMENTS

| 4,445,062 A | 4/1984 | Glaser |
| 4,631,807 A | 12/1986 | Kawada et al. |

(Continued)

FOREIGN PATENT DOCUMENTS

| CN | 101032067 A | 9/2007 |
| CN | 102035281 A | 4/2011 |

(Continued)

OTHER PUBLICATIONS

EP1557928 Description English equivalent.*
(Continued)

*Primary Examiner* — John K Kim
*Assistant Examiner* — Noli Manaloto
(74) *Attorney, Agent, or Firm* — Kilpatrick Townsend & Stockton LLP

(57) ABSTRACT

The present invention relates to a spoke-type permanent magnet rotor (1) used in brushless direct current electric motors (16), forming the rotating part inside a stator (17) that forms the stationary part thereof and having an air gap (18) between the inner surface of the stator (17) and itself, comprising a cylindrical core (2) produced from ferromagnetic laminations or ferromagnetic powder metal, a shaft (3) fixed to the core (2) and forming the rotational axis of the rotor (1), a hub (5) disposed at the center of the core (2) and having a shaft hole (4) that bears the shaft (3), more than one pole segment (6) disposed all around the hub (5), more than one magnet slot (7) arranged between the pole segments (6), more than one magnet (8) tangentially magnetized, placed in the magnet slots (7) and extending out- (Continued)

Figure 1:
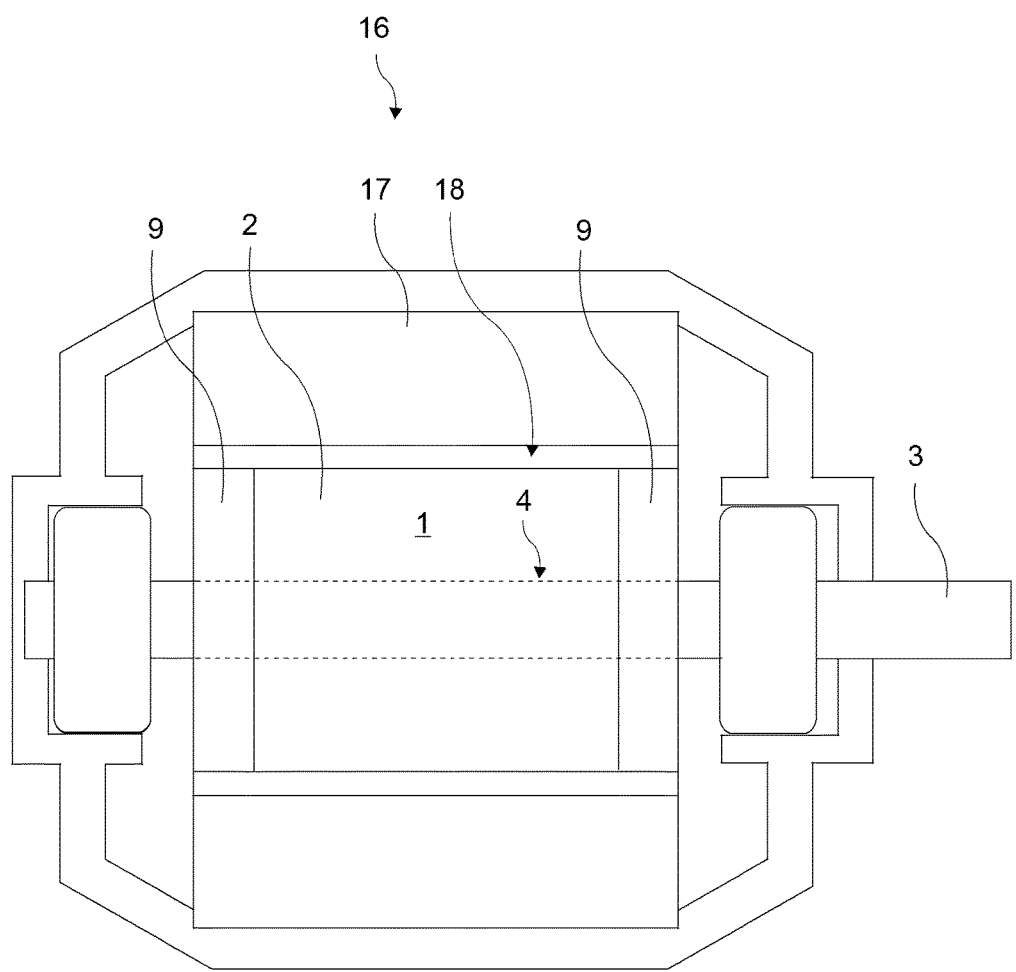

wards in the radial direction, and two end rings (9) produced from non-magnetic materials such as aluminum and plastic and fixed on the front and rear planar surfaces of the core (2) by the injection molding method.

15 Claims, 6 Drawing Sheets

(58) Field of Classification Search
USPC ...... 310/43, 156.12, 156.59, 156.13, 156.14, 310/156.15, 156.26, 156.22, 156.19, 310/156.61, 156.08
See application file for complete search history.

(56) References Cited

U.S. PATENT DOCUMENTS

| | | | |
|---|---|---|---|
| 4,864,175 | A | 9/1989 | Rossi |
| 4,954,736 | A | 9/1990 | Kawamoto et al. |
| 5,200,662 | A | 4/1993 | Tagami et al. |
| 5,463,262 | A * | 10/1995 | Uchida ............... H02K 1/2773 310/156.55 |
| 5,990,592 | A | 11/1999 | Miura et al. |
| 6,703,741 | B1 | 3/2004 | Ifrim |
| 6,987,342 | B2 | 1/2006 | Hans |
| 7,148,598 | B2 | 12/2006 | Ionel et al. |
| 7,151,336 | B2 * | 12/2006 | Yokochi ................. H02K 1/28 310/156.53 |
| 7,196,446 | B2 | 3/2007 | Hans |
| 7,474,028 | B2 | 1/2009 | Shim et al. |
| 8,018,110 | B2 | 9/2011 | Alexander et al. |
| 9,362,792 | B2 | 6/2016 | Figgins et al. |
| 2004/0004407 | A1 | 1/2004 | Laurent et al. |
| 2005/0093391 | A1 | 5/2005 | McMullen et al. |
| 2006/0061227 | A1 | 3/2006 | Heideman et al. |
| 2006/0202580 | A1 * | 9/2006 | Lee ..................... H02K 1/2773 310/156.45 |
| 2006/0220485 | A1 | 10/2006 | Shim et al. |
| 2007/0085437 | A1 * | 4/2007 | Heideman ............ H02K 1/2773 310/156.59 |
| 2007/0252469 | A1 * | 11/2007 | Nishiura .............. H02K 1/2773 310/156.56 |
| 2009/0096308 | A1 * | 4/2009 | Staudenmann ....... H02K 1/2773 310/156.08 |
| 2009/0284094 | A1 * | 11/2009 | Horng .................. H02K 1/2733 310/156.22 |
| 2011/0121668 | A1 | 5/2011 | Condamin et al. |
| 2011/0204740 | A1 | 8/2011 | Vedy et al. |
| 2012/0038237 | A1 | 2/2012 | Li et al. |
| 2012/0112591 | A1 | 5/2012 | Feuertohr et al. |
| 2012/0326548 | A1 | 12/2012 | Nonaka |
| 2013/0187506 | A1 | 7/2013 | Lee et al. |
| 2015/0061441 | A1 * | 3/2015 | Figgins ................ H02K 1/2773 310/156.01 |
| 2015/0303751 | A1 | 10/2015 | Ekin et al. |
| 2015/0318744 | A1 | 11/2015 | Ekin et al. |

FOREIGN PATENT DOCUMENTS

| | | | |
|---|---|---|---|
| CN | 102111025 A | 6/2011 | |
| CN | 102124633 A | 7/2011 | |
| CN | 102377257 A | 3/2012 | |
| DE | 10219190 A | 11/2003 | |
| DE | 102007024406 A1 | 11/2008 | |
| DE | 102009045101 A1 | 4/2011 | |
| DE | 102010061778 A1 | 5/2012 | |
| DE | 102010061784 A1 | 5/2012 | |
| DE | 102010064259 A1 | 6/2012 | |
| EP | 0086272 B1 | 4/1986 | |
| EP | 0582721 B1 | 5/1997 | |
| EP | 0872944 A1 | 10/1998 | |
| EP | 1557928 A1 * | 7/2005 | ........... H02K 1/2773 |
| EP | 1619770 A2 | 1/2006 | |
| EP | 2403109 A2 | 1/2012 | |
| JP | S6135501 A | 2/1986 | |
| JP | S6356138 A | 3/1988 | |
| JP | S63213444 A | 9/1988 | |
| JP | H05244741 A | 9/1993 | |
| JP | H0847190 A | 2/1996 | |
| JP | 2000116044 A | 4/2000 | |
| JP | 2001119877 A | 4/2001 | |
| JP | 2001204146 A | 7/2001 | |
| JP | 2003134705 A | 5/2003 | |
| JP | 2003324925 A | 11/2003 | |
| KR | 20130027417 A | 3/2013 | |
| WO | 2012022731 A2 | 2/2012 | |

OTHER PUBLICATIONS

International Search Report of WO 2014/082837 A1 ( and references cited therein) and Written Opinion of International Searching Authority.
International search report and written opinion, dated Feb. 18, 2015, of International Application No. PCT/EP2013/073406; 7 pgs.
International search report and written opinion, dated May 6, 2015, of International Application No. PCT/EP2013/073415; 8 pgs.
Non-Final Office Action dated Feb. 27, 2017, of U.S. Appl. No. 14/648,858; 8 pgs.
Non-Final Office Action dated Jan. 13, 2017, of U.S. Appl. No. 14/648,840; 12 pgs.
Final Office Action dated Jun. 7, 2017, of U.S. Appl. No. 14/648,840; 12 pgs.
Final Office Action dated Jul. 25, 2017, of U.S. Appl. No. 14/648,858; 22 pgs.
Non-Final Office Action dated Dec. 1, 2017, of U.S. Appl. No. 14/648,858; 17 pgs.
Non-Final Office Action dated Mar. 8, 2018, of U.S. Appl. No. 14/648,840; 14 pgs.

* cited by examiner

SPOKE PERMANENT MAGNET ROTOR

The present invention relates to a spoke permanent magnet rotor used in brushless direct current motors.

The developments and regulations in the field of energy efficiency have increased the demand for high-efficiency electric motors. Spoke-type rotors comprise more than one magnet placed between the pole segments forming the rotor core and the magnets extend in the radial direction around the rotor shaft towards the outer periphery of the rotor core. The magnets are tangentially magnetized with respect to their thickness and the magnetic flux generated by the magnets is collected on the pole pieces between which the magnets are placed. In the spoke-type rotors, the magnetic flux density in the air gap between the stator and rotor, in other words the amount of the useful flux that provides the rotation of the rotor at the desired speed and torque is increased with respect to other magnet rotors. Despite the said advantages of the spoke-type rotors, the mechanical structure of the core weakens and the resistance of the rotor to centrifugal forces decreases due to the magnets extending from the center outwards in the radial direction, that are positioned close to each other. Furthermore, an increase in flux leakages is also observed.

In the United States Patent Application No. US2007085437, a spoke permanent magnet rotor used in electric motors and the production method thereof are explained.

The aim of the present invention is the realization of a spoke-type permanent magnet rotor wherein the resistance thereof to centrifugal forces is increased and the flux leakages are decreased.

The spoke-type rotor realized in order to attain the aim of the present invention, explicated in the first claim and the respective claims thereof and forming the rotating portion in the stator in a brushless direct current motor, comprises a ferromagnetic core, a shaft forming the rotational axis thereof, a hub bearing the shaft at the center of the core, pole segments disposed around the hub, magnets placed in the magnet slots between the pole segments and end rings produced from non-magnetic materials such as plastic or aluminum and fixed on the front and rear surfaces of the core by the injection molding method, and the hub is produced as a single piece with the pole segments and the pole segments are connected to the hub by means of thin bridges. The said bridges serve as a flux barrier between the adjacent magnets on both sides of the pole segments.

In an embodiment of the present invention, the magnet support extensions extending from around the rotor hub into each magnet slot in the radial direction provide the magnet to be positioned in the magnet slot a little further from the hub in the radial direction, decreasing flux leakages. The magnet support extensions are shaped as triangles narrowing from the hub towards the magnet.

In another embodiment of the present invention, openings extending along the core are arranged between the bridges and the support extensions; a cage is formed around the hub by injecting plastic into the openings and the resistance of the rotor to centrifugal forces is increased.

In another embodiment of the present invention, recesses opening from around the shaft towards into the hub are arranged in the rotor shaft hole; a cage is formed around the shaft by injecting plastic into the recesses and the shaft-hub connection is strengthened.

The resistance of the rotor of the present invention to centrifugal forces is increased; magnetic flux leakages are decreased and the performance of the motor is increased.

Figure 2:
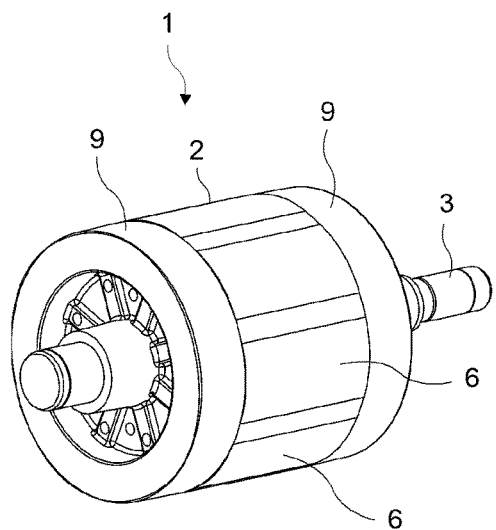
Figure 3:
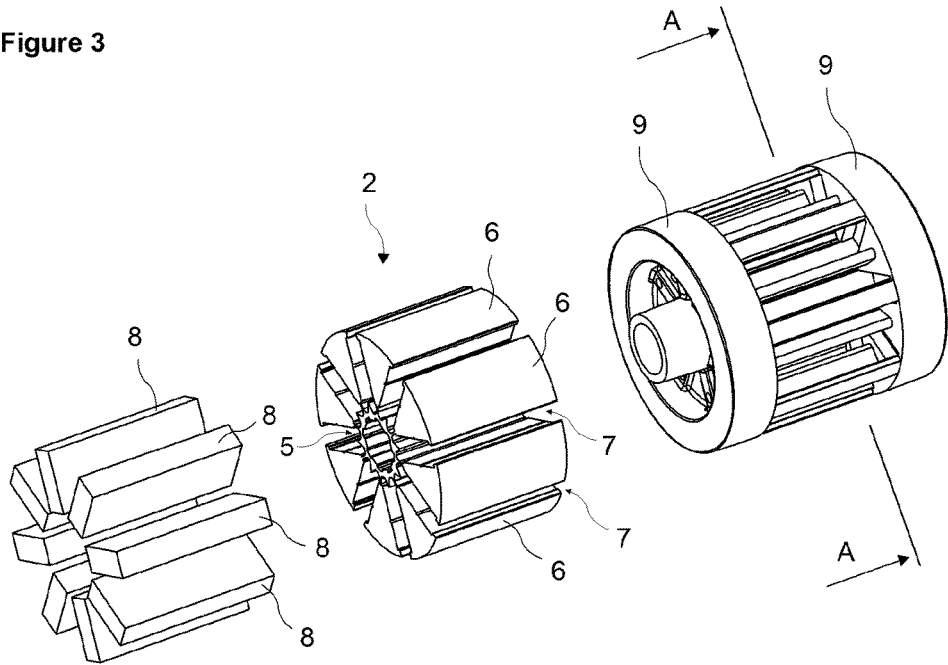
Figure 4:
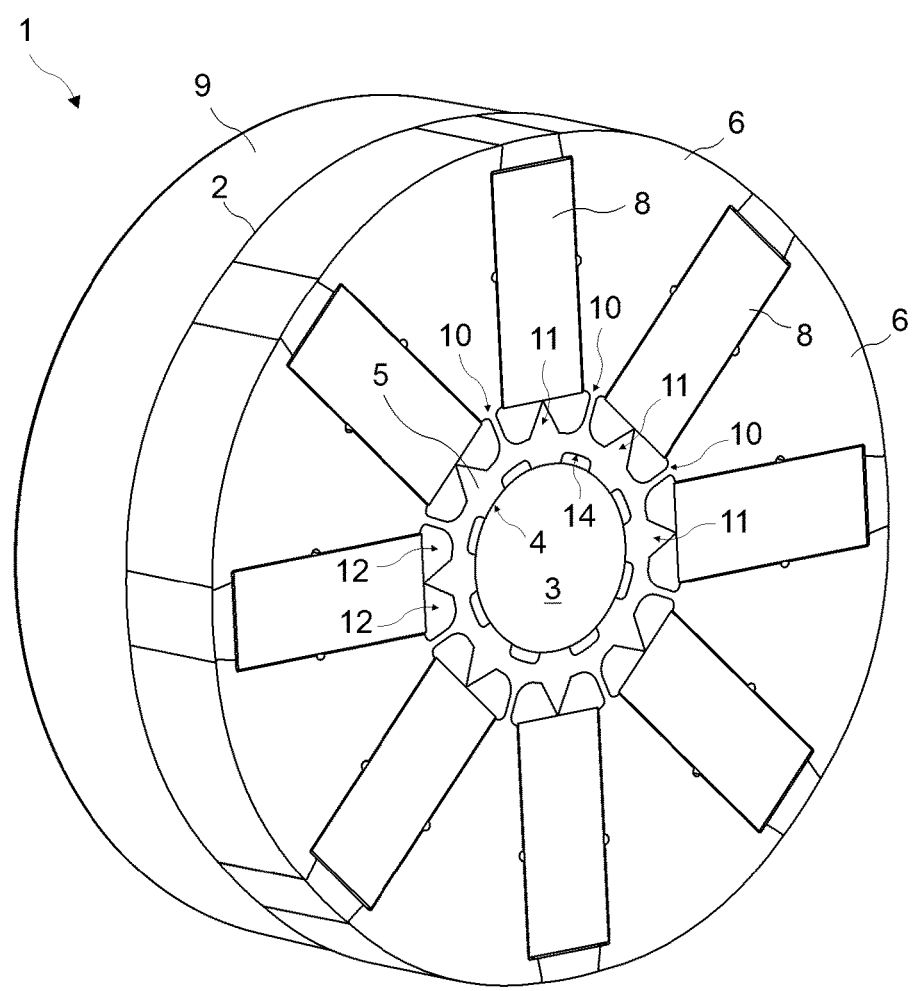
Figure 5:
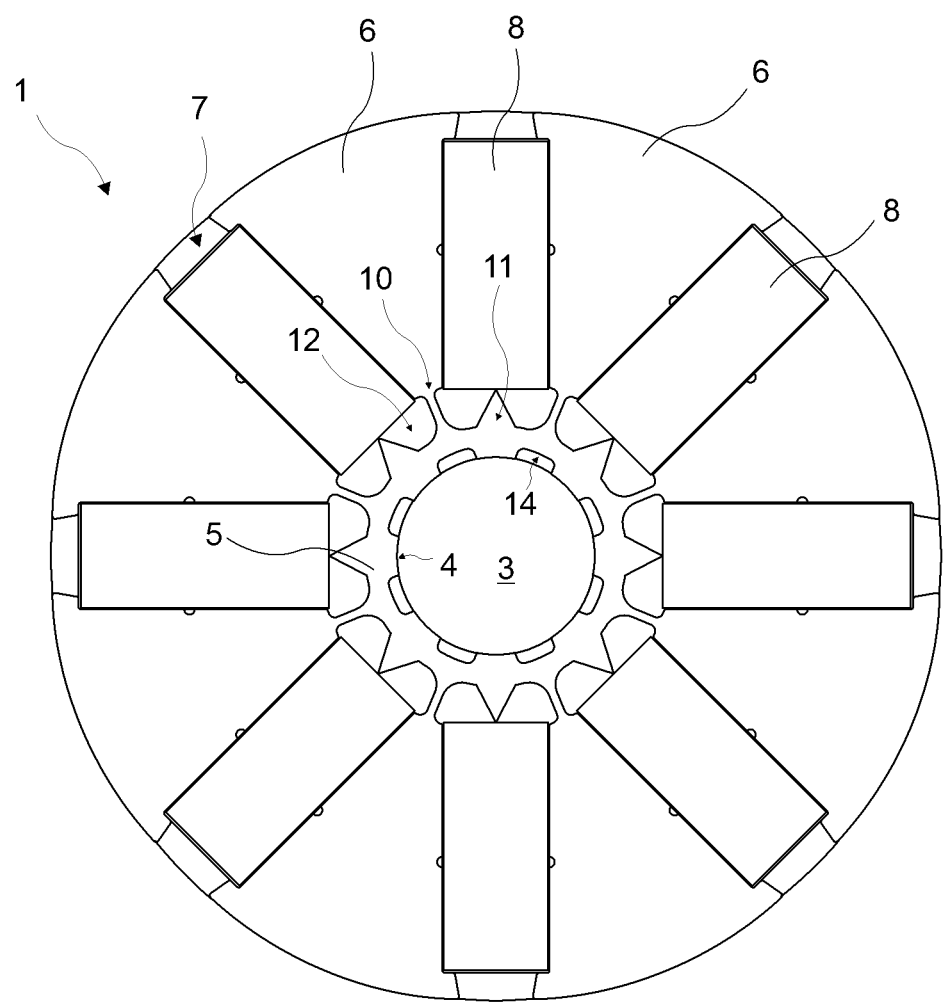
Figure 6:
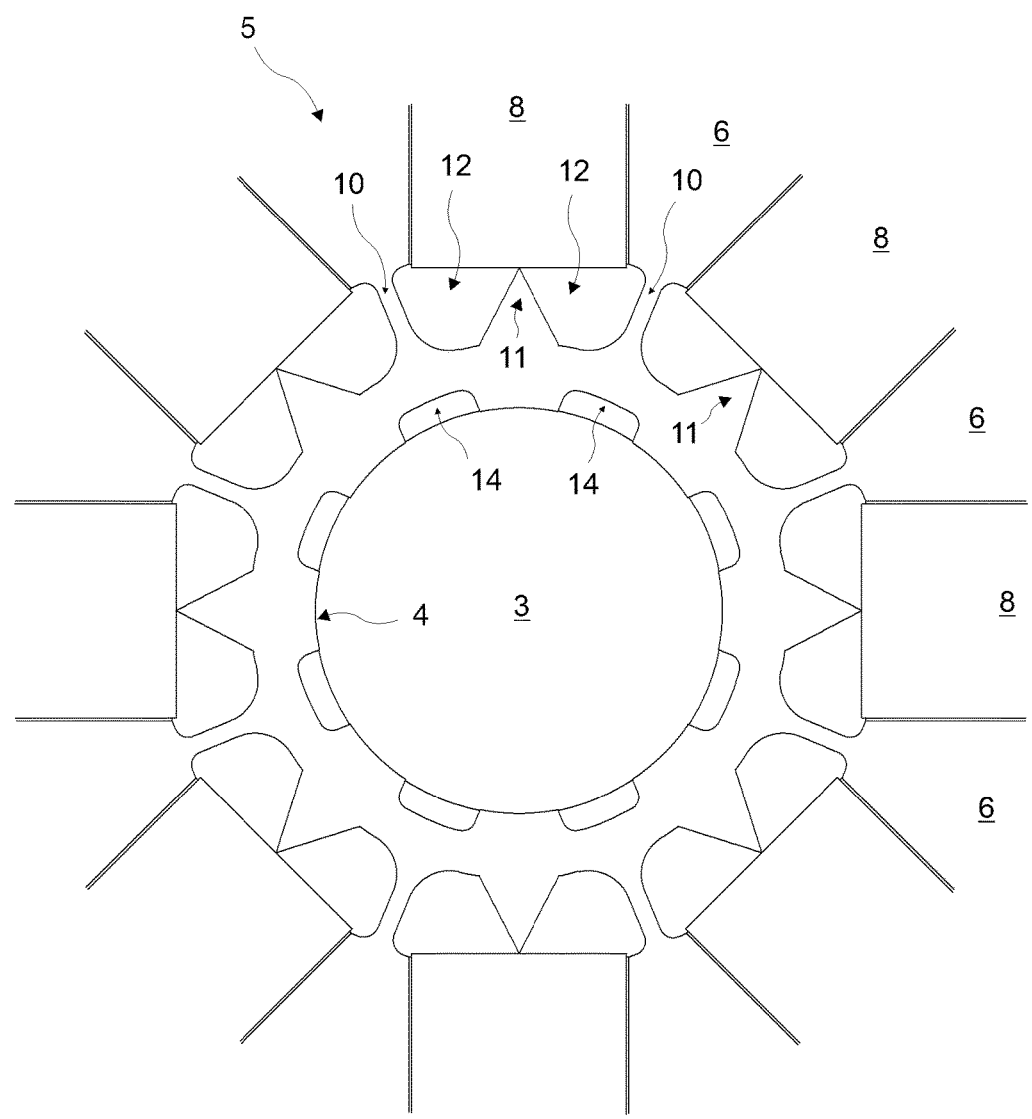
Figure 7:
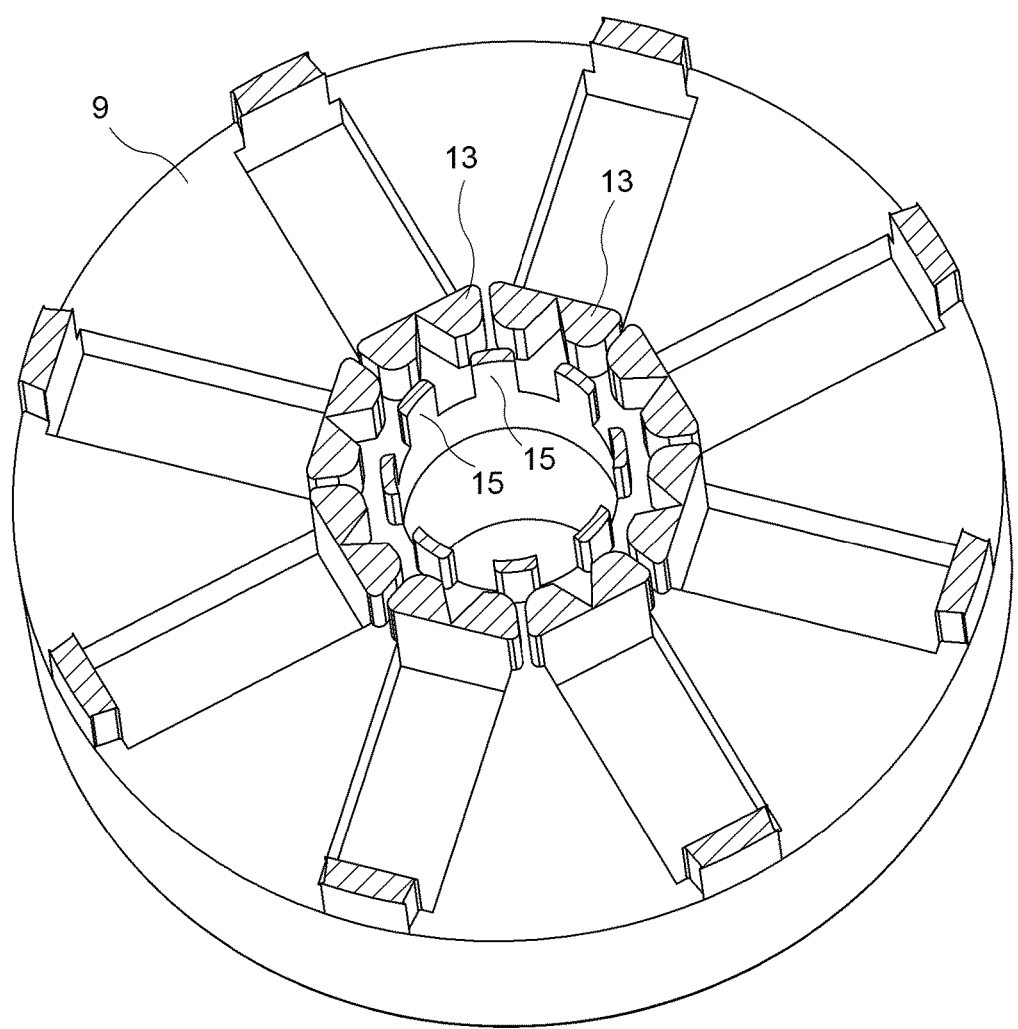

The rotor realized in order to attain the aim of the present invention is illustrated in the attached figures, where:

FIG. 1—is the schematic view of an electric motor.
FIG. 2—is the perspective view of a spoke rotor.
FIG. 3—is the exploded view of a spoke rotor.
FIG. 4—is the partial view of a spoke rotor.
FIG. 5—is the front view of a spoke rotor.
FIG. 6—is the detailed view of the hub region of a spoke rotor.
FIG. 7—is the view of cross-section A-A in FIG. 3.

The elements illustrated in the figures are numbered as follows:
1. Rotor
2. Core
3. Shaft
4. Shaft hole
5. Hub
6. Pole segment
7. Magnet slot
8. Magnet
9. End ring
10. Bridge
11. Support extension
12. Opening
13. Bar
14. Recess
15. Inner column
16. Motor
17. Stator
18. Air gap The spoke-type permanent magnet rotor (1) used in the brushless direct current electric motors (16) driving the components like drum, circulation pump and discharge pump in household appliances like laundry washing and/or drying machine and dishwasher, forming the rotating part inside a stator (17) that forms the stationary part thereof and having an air gap (18) between the inner surface of the stator (17) and itself, comprises a cylindrical core (2) produced from ferromagnetic laminations or ferromagnetic powder metal, a shaft (3) that is fixed to the core (2), forming the rotational axis of the rotor (1), a hub (5) disposed at the center of the core (2) and having a shaft hole (4) that bears the shaft (3), more than one pole segment (6) disposed all around the hub (5), more than one magnet slot (7) arranged between the pole segments (6), more than one magnet (8) tangentially magnetized, placed in the magnet slots (7) and extending outwards in the radial direction, and two end rings (9) produced from non-magnetic materials such as plastic or aluminum and fixed on the front and rear planar surfaces of the core (2) by the injection molding method (FIG. 1, FIG. 2, FIG. 3).

The rotor (1) of the present invention comprises the hub (5) produced from ferromagnetic material as a single piece with the pole segments (6) and more than one bridge (10) that extends in the radial direction between the pole segments (6) and the hub (5) and that connects the pole segments (6) and the hub (5) (FIG. 4, FIG. 5, FIG. 6).

The pole segments (6) forming the core (2) are produced as connected to the hub (5) by means of the bridges (10). The core (2) is produced as a single piece in the mold (lamination mold, sinter-pressing mold etc.) and an additional operation or a centering apparatus etc. is not required for connecting the hub (5) and the pole segments (6) by being co-centered. In the production of the rotor (1), the number of operations is decreased, the production time is shortened and cost advantage is provided.

In an embodiment of the present invention, the rotor (1) comprises bridges (10) with a thickness narrower than the edge from which the pole segment (6) is connected to the hub (5), serving as flux barriers between the opposite poles of the adjacent magnets (8) on both sides of the pole segment (6). The thin bridges (10) are saturated with the magnetic flux (clogged with the magnetic flux) forming at the hub (5) region between the magnets (8) and do not allow flux passage. Magnetic flux leakages between the magnets (8) at the hub (5) region of the rotor (1) are minimized and the useful tangential flux density between the ends of the magnets (8) at the air gap (18) side is provided to be increased.

In another embodiment of the present invention, the rotor (1) comprises more than one support extension (11) supporting the magnet (8) by extending from around the hub (5) into each magnet slot (7) in the radial direction, providing the magnet (8) to be positioned in the magnet slot (7) a little further from the hub (5) and decreasing the flux leakages from the magnet (8) to the hub (5) (FIG. 4, FIG. 5, FIG. 6).

In another embodiment of the present invention, the support extensions (11) are shaped as triangles with the vertexes contacting the magnet (8), narrowing from the hub (5) towards the magnet (8) and serve as flux barriers that decrease flux leakages between the opposite poles of each magnet (8).

In another embodiment of the present invention, the rotor (1) comprises more than one opening (12) arranged between the bridges (10) and the support extensions (11) and surrounding the hub (5) (FIG. 4, FIG. 5, FIG. 6).

In another embodiment of the present invention, the rotor (1) comprises more than one bar (13) produced by injecting non-magnetic material such as plastic into the openings (12), extending along the core (2) in the axial direction between the end rings (9) and forming a cage around the hub (5) (FIG. 7). The bars (13) strengthen the hub (5) and increase the resistance to centrifugal forces around the hub (5).

In another embodiment of the present invention, the rotor (1) comprises more than one recess (14) arranged in the shaft hole (4) and opening from around the shaft (3) into the hub (5) (FIG. 4, FIG. 5, FIG. 6).

The recesses (14) decrease the area of the contact surface of the shaft hole (4) and the shaft (3) and increase the flexibility of the hub (5). While the shaft (3) is nailed to the shaft hole (4) during the production of the rotor (1), the hub (5) is enabled to stretch outwards in the radial direction, thus the mechanical resistance of the hub (5) is increased and the hub (5) is protected from damages such as cracking etc.

In another embodiment of the present invention, the rotor (1) comprises more than one inner column (15) produced by injecting non-magnetic material into the recesses (14), extending along the core (2) in the axial direction between the end rings (9) and forming a cage around the shaft (3) (FIG. 7). The inner columns (15) strengthen the shaft (3)-hub (5) connection and increase the resistance of the rotor (1) to centrifugal forces around the shaft (3).

The resistance of the rotor (1) of the present invention to centrifugal forces at the hub (5) region of the core (2) is increased; magnetic flux leakages are decreased and the performance of the motor (16) is increased.

The invention claimed is:

1. A rotor comprising:
   a cylindrical ferromagnetic core;
   a shaft forming a rotational axis thereof;
   a hub disposed at the center of the cylindrical ferromagnetic core, wherein the hub has a shaft hole that bears the shaft;
   a plurality of pole segments disposed around the hub;
   a plurality of magnet slots, wherein a magnet slot of the plurality of magnet slots is arranged between two consecutive pole segments of the plurality of pole segments, and wherein each magnet slot is configured to receive a magnet extending outwards in a radial direction;
   a first end ring and a second end ring produced from non-magnetic material and fixed on the front and rear planar surfaces of the cylindrical ferromagnetic core, respectively; and
   a plurality of inner columns disposed in the shaft hole and around the shaft, wherein the plurality of inner columns are formed on a surface of the first end ring facing the hub, wherein the plurality of inner columns partially contact the shaft, wherein a first recess is provided between a first set of consecutive inner columns of the plurality of inner columns, wherein a second recess is provided between a second set of consecutive inner columns of the plurality of inner columns, and wherein each of the first recess and the second recess is in line with a different magnet slot of the plurality of magnet slots.

2. The rotor as in claim 1, further comprising:
   a plurality of bridges, wherein a bridge of the plurality of bridges extends in the radial direction between the plurality of pole segments and the hub to connect the plurality of pole segments and the hub, wherein the bridge has a thickness narrower than an edge from which a pole segment is connected to the hub, and wherein the plurality of bridges serve as flux barriers between the opposite poles of the adjacent magnets on both sides of the pole segment.

3. The rotor as in claim 2, further comprising:
   a plurality of support extensions that support the plurality of magnets by extending from around the hub into each magnet slot in the radial direction.

4. The rotor as in claim 3, wherein a support extension of the plurality of support extensions is shaped as a triangle with vertexes contacting the magnet, narrowing from the hub towards the magnet, and wherein the plurality of support extensions serve as flux barriers between the opposite poles of each magnet.

5. The rotor as in claim 2, further comprising:
   a plurality of openings arranged between the plurality of bridges and a plurality of support extensions and surrounding the hub.

6. The rotor as in claim 5, further comprising:
   a plurality of bars, wherein a bar of the plurality of bars is produced by injecting non-magnetic material into an opening of the plurality of openings, wherein the bar extends along the cylindrical ferromagnetic core in the axial direction between the first end ring and the second end ring, and wherein the plurality of bars form a cage around the hub.

7. The rotor as in claim 2, further comprising:
   a plurality of recesses arranged in the shaft hole and opening from around the shaft into the hub.

8. The rotor as in claim 7, wherein a plurality of inner columns are produced by injecting non-magnetic material into the plurality of recesses, wherein the plurality of inner columns extend along the cylindrical ferromagnetic core in the axial direction between the first end ring and the second end ring, and wherein the plurality of inner columns form a cage around the shaft.

9. The rotor as in claim 1, further comprising:
a plurality of support extensions, wherein a support extension of the plurality of support extensions supports the magnet by extending from around the hub toward the magnet slot in the radial direction.

10. The rotor as in claim 9, wherein the support extension is shaped as a triangle with vertexes contacting the magnet, narrowing from the hub towards the magnet, and wherein the plurality of support extensions serve as flux barriers between the opposite poles of each magnet of the plurality of magnets.

11. The rotor as in claim 9, further comprising:
a plurality of bridges extending in the radial direction between the plurality of pole segments and the hub to connect the plurality of pole segments and the hub; and
a plurality of openings arranged between the plurality of bridges and the plurality of support extensions, wherein the plurality of openings surround the hub.

12. The rotor as in claim 11, further comprising:
a plurality of bars, wherein a bar of the plurality of bars is produced by injecting non-magnetic material into an opening of the plurality of openings, wherein the bar extends along the cylindrical ferromagnetic core in the axial direction between the first end ring and the second end ring, and wherein the plurality of bars form a cage around the hub.

13. The rotor as in claim 1, further comprising:
a plurality of recesses arranged in the shaft hole and opening from around the shaft into the hub.

14. The rotor as in claim 13, wherein an inner column of the plurality of inner columns is produced by injecting non-magnetic material into a recess of the plurality of recesses, wherein the inner column extends along the cylindrical ferromagnetic core in the axial direction between the first end ring and the second end ring, and wherein the plurality of inner columns form a cage around the shaft.

15. The rotor as in claim 1, wherein a surface of the first end ring is on a first plane, wherein the first end ring includes a plurality of magnet slots, wherein a magnet slot of the plurality of magnet slots has a surface on a second plane, the second plane below the first plane, wherein the magnet slot has a first end and a second end opposite from the first end, wherein the first end abuts a portion of the first end ring that has a surface on a third plane above the first plane and the second plane.

* * * * *